July 7, 1925.

N. B. POST

CORN POPPING MACHINE

Filed Feb. 28, 1924

Witnesses:

Inventor:
Clarence A. Post
Administrator of the Estate of
Nathaniel B. Post
By Joshua R. H. Potts
His Attorney July 7, 1925.
N. B. POST
CORN POPPING MACHINE
Filed Feb. 28, 1924
1,545,063
5 Sheets-Sheet 5
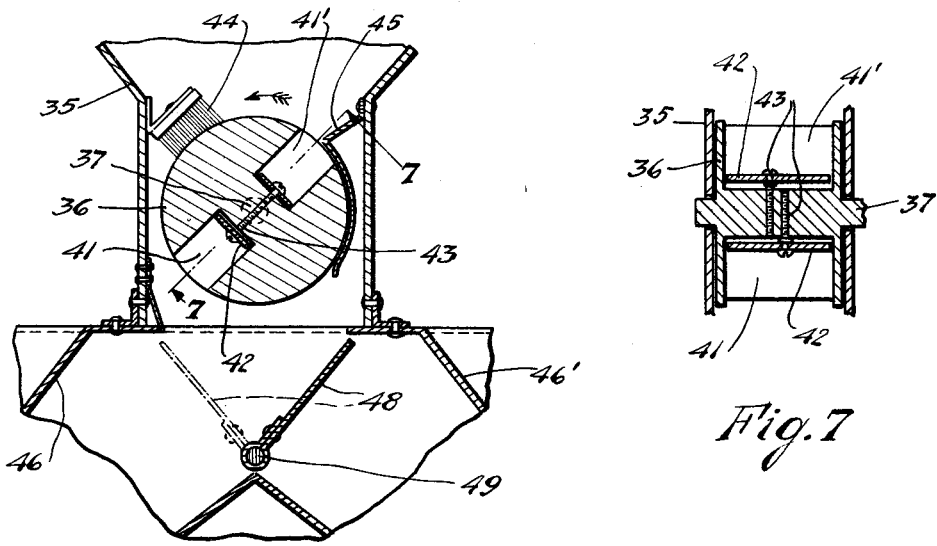
Fig. 6
Fig. 7
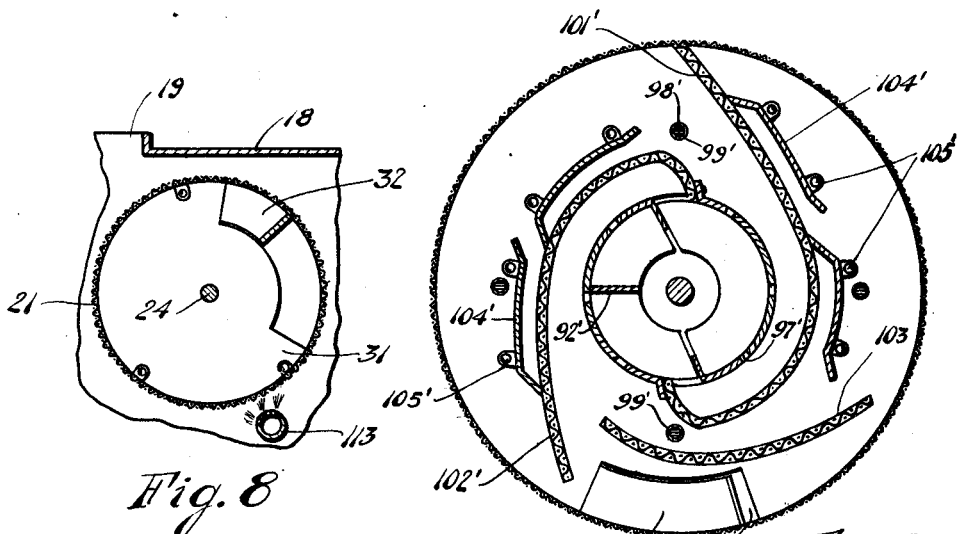
Fig. 8
Fig. 9
Witnesses:
Inventor:
Clarence A. Post
Administrator of the Estate of
Nathaniel B. Post.
By Joshua R H Potts
his Attorney.

Patented July 7, 1925.

1,545,063

UNITED STATES PATENT OFFICE.

NATHANIEL B. POST, DECEASED, LATE OF CHICAGO, ILLINOIS; BY CLARENCE A. POST, ADMINISTRATOR, OF CHICAGO, ILLINOIS, ASSIGNOR TO THE CRACKER JACK CO., OF CHICAGO, ILLINOIS, A CORPORATION OF ILLINOIS.

CORN-POPPING MACHINE.

Application filed February 28, 1924. Serial No. 695,840.

*To all whom it may concern:*

Be it known that NATHANIEL B. POST, deceased, who was a citizen of the United States, and a resident of the city of Chicago, county of Cook, and State of Illinois, had, during his lifetime, invented certain new and useful Improvements in Corn-Popping Machines, of which the following is a specification.

This invention relates to corn popping machines, and more particularly to the rotary cylinder type having means for continuously separating the popped from the unpopped corn and for continuously delivering said popped corn.

An object of the invention is to provide such a machine with means for gradually and continuously feeding the corn through the machine, in order to heat it gradually and to continuously and speedily discharge the popped corn.

Another object is to provide means for speedily delivering all popped corn directly upon popping, in order to avoid scorching or injuring the same.

Another object is to provide a plurality of preliminary heating and popping cylinders and a main popping cylinder, all having a plurality of compartments to give the corn a gradual, step by step, forward movement through the machine and effect a gradual and complete heating and popping thereof.

Another object is to provide a preliminary popping chamber in the main popping cylinder with means therein for picking up and separating the popped corn from the unpopped corn and delivering it directly, centrally into a delivery tube for rapid discharge from the machine.

Another object is to provide means in the main popping cylinder of the machine for constantly and speedily picking up the popped corn and delivering it into a central delivery tube, away from the main heat at the surface of the cylinder, and at the same time leading the unpopped corn along the outer wall of the cylinder close to the strongest heat.

And another object is to provide a plurality of pick-up means, especially adapted for large cylinders, for gathering the popped corn and to provide a delivery tube having means for receiving said popped corn from said pick-up means and rapidly discharging the same.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of the receiving and delivering end of the popping machine;

Fig. 6 is an enlarged cross section of the feeding mechanism, taken on line 6—6 of Fig. 3;

Fig. 7 is an enlarged longitudinal section of the feeding pockets of the feeding mechanism, taken on line 7—7 of Fig. 6;

Fig. 8 is an enlarged detailed section of the preliminary heating cylinder, taken on line 8—8 of Fig. 3, and Fig. 9 is a cross section of a modified form of popping cylinder, taken substantially in the same position as Fig. 4.

Figure 1:
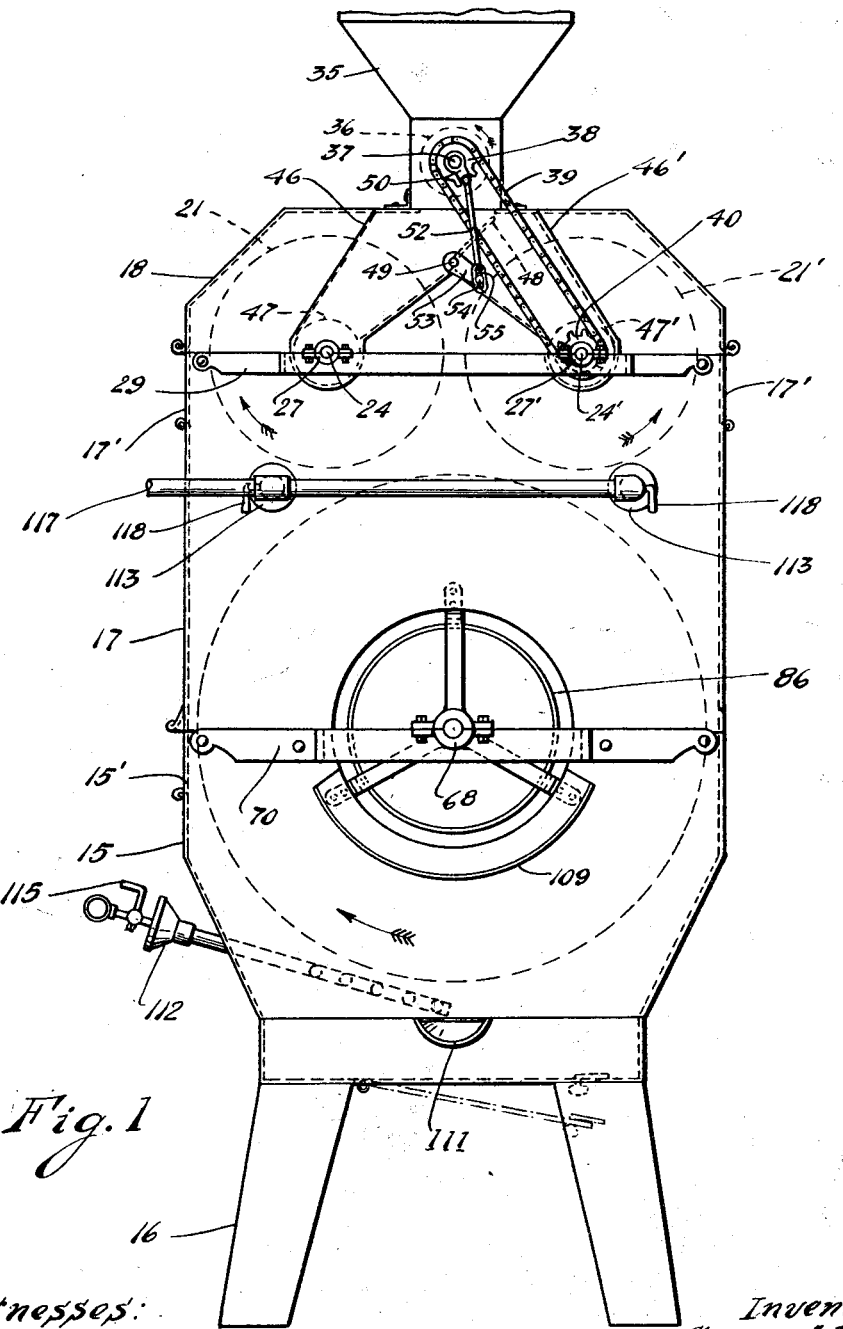
Figure 2:
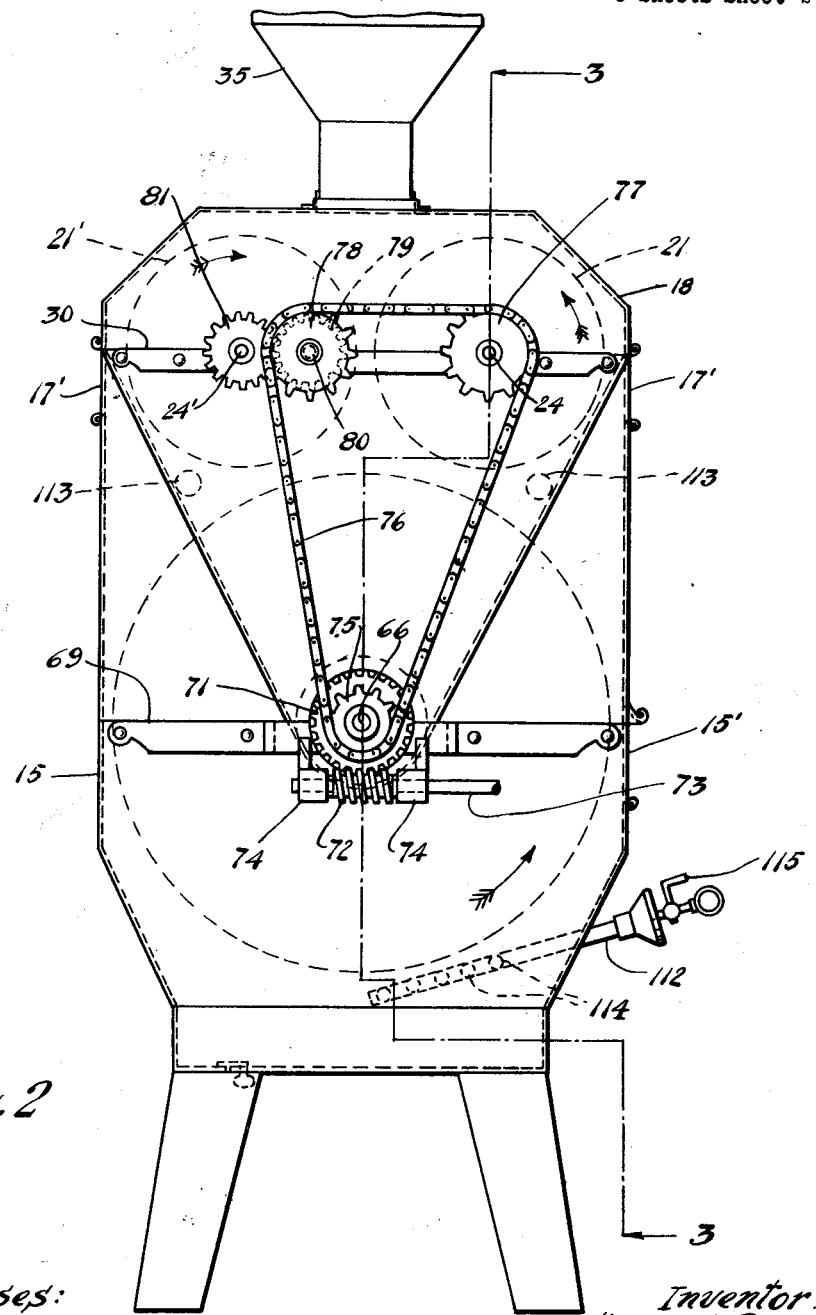
Fig. 2 is an elevational view of the opposite end thereof.

The form of invention illustrated in the drawings includes a machine casing or housing consisting of three separable parts,—a lower part 15 supported on standards 16 and extending to the axis of the main popping cylinder, an intermediate part 17 extending to the axis of the preliminary popping and heating cylinders, and an upper part or hood 18 which is provided with outlets 19 on the top for the escape of heat.

Inspection openings 15' and 17' are provided at the upper edges of the sides, adjacent the ends, of parts 15 and 17, respectively, for inspecting the interior mechanism of the machine and for providing ready access thereto.

Two preliminary heating cylinders or preheaters 21 and 21' are used for the average size popping machine, for gradually heating the corn to the popping stage, but more than two preliminary heaters may be used in large machines, and only one may suffice for a small machine. The corn may be gradually heated to the popping stage in these cylinders and may also be heated beyond the initial popping stage and to any popping degree, as will be explained hereafter. These preliminary heating cylinders are formed of fine meshed wire gauze and each has a head 22 fastened with a spider 23 upon a shaft 24, and a head 25 fastened on said shaft with a bracket 26. Said shaft is journaled in bearings 27 and 28 which are provided on cross bars 29 and 30 fastened to the upper edge of the intermediate part 17 of the casing.

Figure 3:
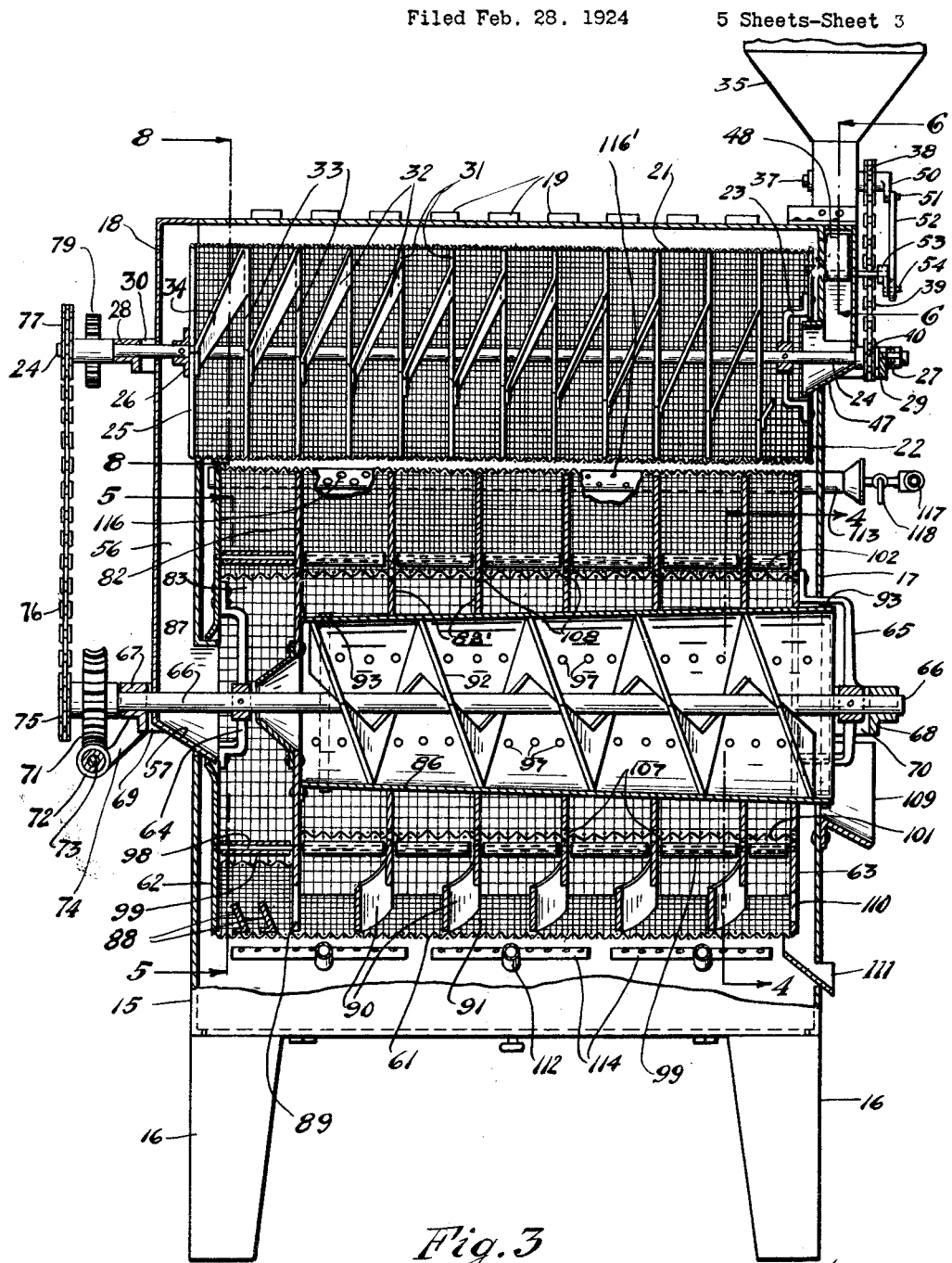
Fig. 3 is a longitudinal section of the machine, taken on line 3—3 of Fig. 2.

Each of the heating cylinders is divided by means of cross portions 31 into a plurality of compartments. A deflector or inclined lip 32 is cut from the outer part of each partition for one quarter of the circumference, bent over to the next succeeding partition and preferably fastened thereon, thus leaving a passage 33 for corn to be urged through to the next compartment by said deflector 32 during one quarter of each revolution. These deflectors are slightly bent or curved, to force the corn toward the discharge end of the cylinder, as best shown at 34 in Fig. 3, to facilitate the moving of the corn through said preliminary heaters. These cylinders are substantially alike in construction, except that one has the deflectors 32 curved at 34 in a right hand direction and the other has them curved in a left-hand direction, and that the cylinders rotate in reverse directions, the cylinder 21' being mounted with its shaft 24' in bearings in said cross bars 29 and 30, like the cylinder 21.

The hopper 35 for receiving and retaining the unpopped corn is fastened upon the hood 18 of the casing by means of suitable brackets or the like, and a feed drum or measuring device 36 which is fixed on a shaft 37 is mounted to rotate with said shaft in the neck of said hopper, said shaft and feed drum being driven by a sprocket 38 fastened on said shaft, a chain 39, and a sprocket 40 on the shaft 24'. A separate feed pocket 41 for each heating cylinder is provided in said feed drum and each pocket has a movable bottom plate 42 made adjustable by a screw 43 engaging into a threaded opening in shaft 37, to regulate the size of said pocket and the charge fed thereby. A brush 44 is mounted on one side and a guard plate 45 on the other side between said drum and the hopper wall to insure feeding of exact charges by said feed drum.

A spout leads from the neck of the hopper and branches into two forks 46 and 46' discharging through funnel like outlets 47 and 47' into the cylinders 21 and 21', respectively, (see Figs. 1 and 3) and a trap or gate 48 is mounted on a shaft 49 at the junction of the two branches to alternately close one branch or the other, as shown in Figs. 1 and 6. The means for operating said trap includes a crank arm 50 fastened on the drum shaft 37 and having a pin 51 which engages in one end of a link 52, and a crank arm 53 fastened on the trap shaft 49 and having a pin 54 which engages in a slot 55 in the other end of said link 52 (see Figs. 1 and 3). The crank arms 50 and 53 are so fastened on their shafts 37 and 49 and the slot 55 is made of such length that with each downward revolution of crank arm 50 the top of slot 55 will push the pin 54 and its arm 53 downward and the gate or trap 48 over to close branch 46', as shown in Fig. 6, and at the same time when pocket 41 discharges in branch 46; while in Fig. 1 said arms and link are shown directly after the completed downward stroke, and the arm 50 swinging upward while the slot 55 in link 52 rides for a moment over pin 54 on arm 53, thus giving the gate 48 time to remain closed until the charge of corn from pocket 41 has completely entered branch 46, and thereafter the continuous upward swing of arm 50 for substantially 180 degrees will swing arm 53 and with it the gate 48 approximately 90 degrees over to close branch 46, as shown in dotted lines in Fig. 6, and permit the second pocket 41' on drum 36 to discharge into branch 46'.

The separate charges of corn or other grain to be popped are fed by the pockets 41 of the rotating drum alternately into the spout branches 46 and through their funnels 47 centrally into the first heating compartment of each cylinder in succession. The first deflector 32, while at the lower end of the cylinder and during the first upward moving one quarter of the revolution engages the grain and moves it through opening 33 into the next compartment, where the next deflector engages the grain during the one quarter turn of the next revolution, thus moving the grain step by step through the compartments and through the last outlet 33 in the discharge head 25 of said cylinder, and into the delivery spout 56 provided at that end of the housing and through its funnel shaped end 57 into the inlet end of the main popping cylinder.

The main popping cylinder 61 is preferably formed of fine wire gauze and provided with heads 62 and 63 fastened respectively by means of spiders 64 and 65 upon a shaft 66 journaled in bearings 67 and 68 in guard plates 69 and 70 which are fastened to the two ends of the lower part 15 of the casing. Said shaft is driven by an attached worm wheel 71 actuated by a worm 72 provided on a drive shaft 73 which is rotated by any suitable source of power and is mounted in brackets 74 fastened on the guard plate 69. A sprocket 75 is mounted to rotate with shaft 66 and the worm gear, and by means of a chain 76 drives the sprocket 77 fastened on the preliminary heater shaft 24, and also drives the sprocket 78 with its attached gear 79 mounted on a stub shaft 80 which is rotatably mounted in cross bar 30, said gear 79 in turn driving a gear 81 and therewith the attached shaft 24'. Said drive gearing thus rotates the pre-heating cylinders in reverse directions, and as the sprocket 75 of the main cylinder shaft 66 has less teeth than the sprocket 77 and 78 and the main cylinder is larger in diameter than the pre-heater cylinders, said pre-heating cylinders will travel with considerably less circumferential speed than the main cylinder, thereby giving the corn a gradual and thorough preliminary heating.

Figure 5:
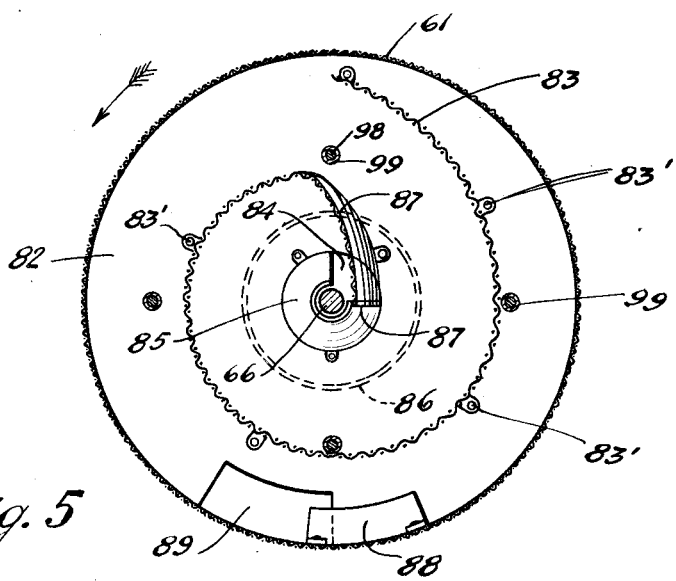
Fig. 5 is a vertical section taken across the preliminary chamber of the main cylinder, on line 5—5 of Fig. 3.

A plurality of cross partitions 82 and 82' divide the main cylinder into chambers or compartments, thereby preventing the popping corn from jumping any great distance lengthwise of the cylinder. Said chambers are alike in construction except the first chamber between the cylinder head 62 and the next partition 82, this forming a receiving chamber or a specially constructed preliminary popping chamber. A separator screen 83 is mounted in this chamber and fastened to partition 82 by any suitable means 83' (see Figs. 3 and 5). Said screen begins a short distance, about three fourths inch, from the cylindrical or gauze wall of cylinder 61 to let the unpopped corn pass by it and extends spirally inward to a slot 84 on a conical tube 85 at the center of said chamber for discharging corn, which has been popped in the pre-heaters or which pops in this chamber, directly into the delivery tube 86 provided at the center of the cylinder. The screen 83 is curved forward at the inner portion 87 adjacent shaft 66, to force the popped corn toward tube 86, and a space is left under said portion 87 for the free entrance of corn from spout end 57. Said screen is of proper mesh to let unpopped corn pass through toward the outer part of the cylinder near to the source of heat. Inclined deflector plates 88 are mounted at the outer wall of said chamber to move the unpopped corn toward and through the opening 89 in partition 82 into the next popping chamber, and curved deflecting plates 90 are provided at the outer part of each partition 82' for moving the unpopped corn step by step through openings 91 formed by said plates into the succeeding chambers.

Figure 4:
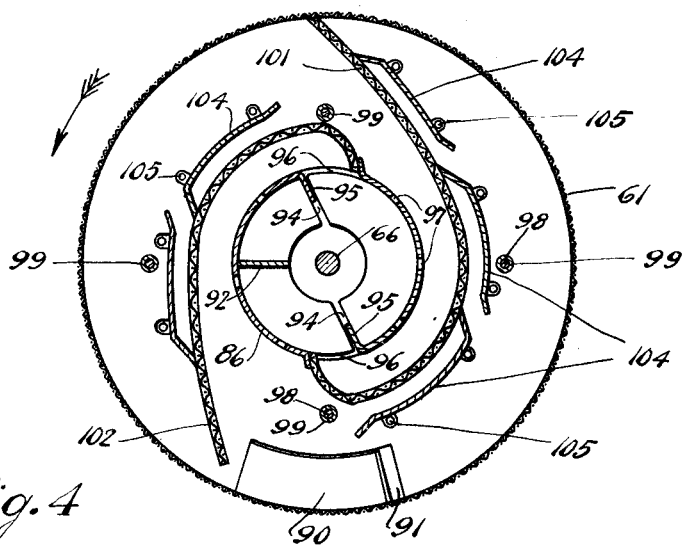
Fig. 4 is a vertical section taken across the main popping cylinder, on line 4—4 of Fig. 3.

The delivery tube 86 is provided with spirally formed conveyor flights or screw threads 92 for forcing the popped corn speedily to the open discharge end. These threads are formed in two longitudinally extending halves each half fastened to a corresponding half on the delivery tube, and said two halves of tube and screw threads being held together by rings 93 at the two ends of the tube. The two halves of the threads are substantially joined (see Fig. 4) with a narrow space 94 left between them for receiving the thin metallic deflecting lips 95 turned inward from one side of each half of the delivery tube for preventing the popped corn delivered in said tube from falling out through the longitudinal intake slots 96. Several rows of openings 97 are provided in said tube for the unpopped and small kernels to drop back into the cylinder. Tie rods 98 and spacing sleeves 99 hold the partitions 82 and 82' and the cylinder heads 62 and 63 together and in position.

Means are provided in each popping chamber or compartment for picking up the popped corn in that chamber and delivering it into the delivery tube 86. Said means comprises one or more main pick-up screens, two such screens being preferably used in the average cylinder (see Figs. 4 and 9), a primary screen 101 extending spirally from the outer wall of the cylinder to the intake slot 96 on tube 86, and a secondary screen 102 beginning a short distance from said outer wall and extending spirally inward to a second intake slot 96 on tube 86. The spaces between the outer end of said secondary screen and the outer wall is about three fourths inch and is provided to let the unpopped corn pass freely along the outer cylinder wall, more than one such secondary screen will be used in the large cylinders.

In addition to the two main pick-up screens I also use one or more intermediate or auxiliary screens 103, as shown in the modified form in Fig. 9. These auxiliary screens are placed intermediate the main screens 101' and 102', and are curved spirally inward beginning a short distance inward from the outer wall, like the secondary screens 102', and extending to about an inch from the succeeding main screen to deliver the popped corn thereon. Several auxiliary screens are preferably used in the larger cylinders to lead the corn onto the several main screens for speedily discharging the corn into the delivery tube.

Means is provided in the form of shields 104 for deflecting the direct heat from the burners, said shields being placed between the pick-up screens and the outer wall of the cylinder and are fastened to the partitions by means of rivets 105 passing through ears of said shields, or in any suitable manner. These shields prevent the corn from being scorched and injured.

The modified form shown in Fig. 9 is similar in construction to the form above described, with the exception of the additional auxiliary pick-up screens, said form containing deflectors 90', passages 91', tie rods 98', sleeves 99', and shields 104' with fastening means 105'.

Pick-up screens are constructed to extend the entire length of the main popping portion of cylinder 61. Slots 107 and 108 are provided in the intermediate partitions for inserting the screens 101 and 102 respectively, said screens being inserted in said slots from the discharge end of the cylinder before the cylinder head 63 has been fastened in position, and are held in place between said cylinder head 63 and the first partition 82 by the fastening of tie rods 98. These screens are thus readily removed and replaced by removing the tie rods and the cylinder head 63 and the adjacent parts 15 and 17 of the casing.

A spout 109 is provided on the casing part 15 for delivering the popped corn from the tube 86, and a waste opening 110 is provided in cylinder head 63 a short distance from the outer wall for discharging accumulation of waste corn and material through a waste spout 111 fastened at the lower end of the casing.

The means for heating the corn comprises main heating means 112, which may be in the form of the usual gas burners or any other suitable means, preferably arranged crosswise under the upward revolving quarter of the main cylinder and further comprises additional heating members 113, one being placed lengthwise under the upward revolving quarter of each pre-heating cylinder, which members may also be in the form of gas burners. The main members or burners 112 are provided with perforated heating fingers 114 extending lengthwise of the cylinder and nearly joining with their ends, and a valve 115 is provided for each burner for regulating it separately to finish popping the corn properly as it progresses through the popping chambers of said main cylinder. Each of the burners 113 under the preheating cylinders preferably has the gas openings made larger and nearer together at the discharge end of the cylinder than at the receiving end, as shown at 116 and 116' in Fig. 3, to provide an increasing heat under the corn as it progresses through the preheating cylinders bringing it gradually to the popping stage. The burners under the several pre-heaters are connected by a cross pipe 117, preferably placed at the receiving end of the machine as shown, and are provided with control valves 118 at this end of the machine. These main and auxiliary burners are connected in any suitable manner to any convenient supply main or mains.

The heat from the main burners 112 is effective in heating the corn in the pre-heating cylinders, but is not fully sufficient therefor, wherefor a heater 113 is placed under each pre-heating cylinder to provide direct heating thereof and exact control of the heat to furnish the exact amount of heat desired. The heat in these cylinders may thus be raised sufficiently to begin popping the corn in these cylinders, and may be raised to pop said corn to any desired extent or degree therein, in view of the fact that the pick-up means 83 in the preliminary popping chamber of the main popping cylinder has been provided to gather popped corn and deliver it directly through its cone 85 into the delivery tube 86 for rapid delivery from the machine, while the unpopped corn is dropped through said screen 83 to the outer wall of the cylinder 61 and subjected to the direct heat of the main burners 112.

The operation of the various parts of the machine has been explained with the description of said parts, and will be apparent therefrom. It will also be apparent that with the valve controlled heaters 113 any degree of heat may be applied to cylinders 112 and that the corn therein may be heated to any degree and brought to any degree of popping. It is also apparent that the progress of the corn through the entire machine is gradual and the corn is subjected to a gradually increasing heat through the machine, thus assuring a thorough and most complete popping thereof, and that the popped corn is completely separated from defective kernels and waste and is speedily discharged from the machine in a continuous stream.

While herein is illustrated and described the preferred form of construction for carrying this invention into effect, this is capable of variation and modification without departing from the spirit of the invention. I, therefore, do not wish to be limited to the precise details of construction set forth, but desire to avail myself of such variations and modifications as come within the scope of the appended claims.

Having described the invention, what is claimed as new and desired to be secured by Letters Patent is:

1. A popping machine comprising a plurality of pre-heaters, a hopper provided with a rotary feed drum, a plurality of pockets in said drum to correspond to the number of preheaters, means for adjusting the size of each pocket, and means for feeding the charge from each pocket in rotation to its corresponding preheater.

2. A popping machine comprising a plurality of similar preheating cylinders, each containing a plurality of similar compartments and having means therein to move grain intermittently through said compartments, and adjustable hopper means for feeding a charge of grain to each of said cylinders intermittently and in succession.

3. A popping machine comprising a plurality of preheating devices, each being provided with a plurality of similar compartments and having means therein arranged to move grain intermittently from one compartment to the other through said machine.

4. A popping machine comprising a plurality of preheating devices, each provided with a plurality of similar compartments having means arranged to move grain intermittently through said compartments, and a main popping device continuously receiving the heated grain from said preheaters.

5. In a popping machine, a preheater provided with a series of partitions forming a series of similar compartments, a deflecting member extending from each partition to move the grain through an opening provided in one of the partitions for giving the grain an intermittent movement from compartment to compartment.

6. In a popping machine, a preheating cylinder provided with cross partitions forming a series of like compartments, a deflecting lip cut from each partition and bent to join the succeeding partition thereby forming an opening in each partition through which the grain is urged by the preceding lip during a part of each revolution of said cylinder.

7. In a popping machine, a preliminary heating cylinder, a series of partitions forming a series of compartments in said cylinder, means on said partitions for moving said grain gradually through said compartments, and heating means adjacent said cylinder provided with means for increasing the heat toward the discharge end of said cylinder.

8. A popping machine comprising a preheating device for heating the grain to a popping condition, heating means with control means thereon adjacent said preheating device for directly and properly heating the same, popping means for receiving the heated grain from said device, and additional controlled heating means for heating both the preheating device and the popping means.

9. A popping machine comprising a preheating device for heating the grain to a popping condition, direct heating means provided adjacent said device, popping means for receiving the heated grain from said device, and heating means for directly heating said popping means and for indirectly heating said preheating device.

10. A popping machine comprising a preheating cylinder, means extending longitudinally along said cylinder for directly heating the same, a main popping cylinder for receiving said heated grain, means for directly heating said main popping cylinder and for indirectly heating said preheating cylinder, and separate control means for each of said heating means.

11. A popping machine comprising a preheating cylinder having means therein for gradually moving the grain therethrough, a popping cylinder provided with a preliminary popping chamber and means for gradually advancing the unpopped grain, means in said popping cylinder for rapidly delivering the popped grain, and means for conducting popped grain from said preheating cylinder and for transferring it through said preliminary chamber directly into said rapid delivering means in the main cylinder.

12. A popping machine comprising a preheating cylinder, a main popping cylinder provided with separate compartments, means extending through said main cylinder for receiving popped corn from each of said compartments and conveying it rapidly out of said machine, means for conducting the heated corn from said preheater into said main cylinder, and means in the receiving compartment of said main cylinder for delivering popped corn from said preheater directly into said rapid conveying means and the unpopped corn into the next compartment.

13. A popping machine comprising a preliminary heating cylinder provided with means for gradually moving grain therethrough and for gradually heating the same, a main popping cylinder provided with a preliminary popping chamber and a series of similar compartments connected therewith, means in said main cylinder for rapidly delivering popped grain, means in each compartment for picking up popped grain and placing it in said delivering means, and means for conveying grain from said heating cylinder centrally through said preliminary chamber directly into said delivering means.

14. A popping machine comprising a preliminary heating cylinder and a popping cylinder receiving heated grain therefrom, a preliminary popping chamber in said popping cylinder, a plurality of popping compartments connected therewith, means for delivering heated grain from said preheating cylinder into said chamber, and means for picking up popped grain and delivering it rapidly from said machine.

In testimony whereof I. CLARENCE A. POST, the administrator of the estate of Nathaniel B. Post, deceased, have signed my name to this specification in the presence of two subscribing witnesses.

CLARENCE A. POST,
*Administrator of the Estate of Nathaniel B. Post, Deceased.*

Witnesses:
FREDA C. APPLETON,
JOSHUA R. H. POTTS.